US010164929B2

(12) United States Patent
Yoakum

(10) Patent No.: US 10,164,929 B2
(45) Date of Patent: Dec. 25, 2018

(54) INTELLIGENT NOTIFICATION OF REQUESTS FOR REAL-TIME ONLINE INTERACTION VIA REAL-TIME COMMUNICATIONS AND/OR MARKUP PROTOCOLS, AND RELATED METHODS, SYSTEMS, AND COMPUTER-READABLE MEDIA

(71) Applicant: Avaya Inc., Basking Ridge, NJ (US)

(72) Inventor: John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 178 days.

(21) Appl. No.: 13/803,292

(22) Filed: Mar. 14, 2013

(65) Prior Publication Data
US 2014/0095633 A1    Apr. 3, 2014

Related U.S. Application Data

(60) Provisional application No. 61/706,951, filed on Sep. 28, 2012.

(51) Int. Cl.
*G06F 15/16* (2006.01)
*G06N 5/02* (2006.01)
(Continued)

(52) U.S. Cl.
CPC ............ *H04L 51/24* (2013.01); *H04L 51/043* (2013.01); *H04L 51/12* (2013.01)

(58) Field of Classification Search
CPC .......... H04L 51/24; H04L 51/04; H04L 51/10
(Continued)

(56) References Cited

U.S. PATENT DOCUMENTS 6,714,967 B1 * 3/2004 Horvitz ................ G06Q 10/107
370/265
7,107,316 B2 * 9/2006 Brown .................... H04L 29/06
709/207

(Continued)

FOREIGN PATENT DOCUMENTS

| CN | 101292479 | 10/2008 |
|---|---|---|
| CN | 101689153 | 3/2010 |

(Continued)

OTHER PUBLICATIONS

Pedro Rodriguez et al. (Advanced Videoconferencing Services Based on WEBRTC), Jul. 17-32, 2012, p. 180-184.*

(Continued)

*Primary Examiner* — Esther B. Henderson
*Assistant Examiner* — Golam Mahmud
(74) *Attorney, Agent, or Firm* — Sheridan Ross P.C.

(57) ABSTRACT

Intelligent notification of requests for real-time online interaction, and related methods, systems, and computer-readable media are disclosed. In this regard, in one embodiment, a method for intelligently processing a request for real-time online interaction comprises receiving, by a computing device, a request for real-time online interaction directed to a recipient identifier associated with a recipient device of a recipient and originating from a requestor device of a requestor. The method further comprises determining, by the computing device, an interruption indicator that indicates a recipient activity priority relative to a delivery priority of the request for real-time online interaction. The method additionally comprises delivering a notification of the request for real-time online interaction to the recipient device of the recipient, responsive to the interruption indicator indicating that the delivery priority of the request for real-time online interaction exceeds the recipient activity priority.

19 Claims, 10 Drawing Sheets

(51) Int. Cl.
*H04L 9/32* (2006.01)
*H04L 12/58* (2006.01)

(58) Field of Classification Search
USPC ........................................................ 709/206
See application file for complete search history.

(56) References Cited

U.S. PATENT DOCUMENTS

| | | | |
|---|---|---|---|
| 7,145,898 B1* | 12/2006 | Elliott | H04L 12/66 370/352 |
| 7,266,591 B1 | 9/2007 | Johnston | |
| 7,379,993 B2* | 5/2008 | Valdes | H04L 41/142 709/224 |
| 7,636,348 B2 | 12/2009 | Bettis et al. | |
| 7,730,309 B2 | 6/2010 | Zimmermann | |
| 8,015,484 B2 | 9/2011 | Backer | |
| 8,250,635 B2 | 8/2012 | Chari et al. | |
| 8,300,632 B2 | 10/2012 | Davis et al. | |
| 8,467,308 B2 | 6/2013 | Johnston | |
| 8,494,507 B1 | 7/2013 | Tedesco et al. | |
| 8,601,144 B1 | 12/2013 | Ryner | |
| 8,605,711 B1 | 12/2013 | Sinnreich et al. | |
| 8,606,950 B2 | 12/2013 | Glatron et al. | |
| 8,693,392 B2 | 4/2014 | Cooper et al. | |
| 8,695,077 B1 | 4/2014 | Gerhard et al. | |
| 8,737,596 B2 | 5/2014 | Kelley et al. | |
| 8,744,147 B2 | 6/2014 | Torti | |
| 8,832,271 B2 | 9/2014 | McCarty | |
| 8,856,236 B2* | 10/2014 | Moore | H04L 12/14 379/88.14 |
| 8,861,692 B1 | 10/2014 | Phelps et al. | |
| 8,867,731 B2 | 10/2014 | Lum et al. | |
| 2002/0161685 A1 | 10/2002 | Dwinnell | |
| 2003/0112766 A1 | 6/2003 | Riedel et al. | |
| 2003/0120599 A1 | 6/2003 | Agboatwalla et al. | |
| 2003/0131245 A1 | 7/2003 | Linderman | |
| 2003/0188193 A1 | 10/2003 | Venkataramappa | |
| 2004/0019494 A1 | 1/2004 | Ridgeway et al. | |
| 2004/0030750 A1* | 2/2004 | Moore | H04L 12/14 709/204 |
| 2004/0081173 A1 | 4/2004 | Feather | |
| 2004/0093515 A1 | 5/2004 | Reeves, Jr. | |
| 2004/0167984 A1 | 8/2004 | Herrmann | |
| 2004/0216173 A1 | 10/2004 | Horoszowski et al. | |
| 2005/0084082 A1 | 4/2005 | Horvitz et al. | |
| 2005/0177380 A1 | 8/2005 | Pritchard et al. | |
| 2006/0104526 A1 | 5/2006 | Gringeler et al. | |
| 2006/0155814 A1 | 7/2006 | Bennett et al. | |
| 2006/0159063 A1 | 7/2006 | Kumar | |
| 2006/0200855 A1 | 9/2006 | Willis | |
| 2006/0230438 A1 | 10/2006 | Shappir et al. | |
| 2007/0083929 A1 | 4/2007 | Sprosts et al. | |
| 2007/0130323 A1* | 6/2007 | Landsman | H04L 67/24 709/224 |
| 2007/0143408 A1 | 6/2007 | Daigle | |
| 2007/0255662 A1* | 11/2007 | Tumminaro | G06Q 20/027 705/79 |
| 2007/0283423 A1* | 12/2007 | Bradley | H04L 67/1061 726/4 |
| 2008/0046414 A1 | 2/2008 | Haub et al. | |
| 2008/0046457 A1 | 2/2008 | Haub et al. | |
| 2008/0046838 A1 | 2/2008 | Haub et al. | |
| 2008/0127137 A1 | 5/2008 | Becker et al. | |
| 2008/0162642 A1 | 7/2008 | Bachiri et al. | |
| 2008/0192646 A1 | 8/2008 | Song et al. | |
| 2008/0270541 A1 | 10/2008 | Keener et al. | |
| 2009/0070477 A1* | 3/2009 | Baum | H04N 21/2187 709/231 |
| 2009/0094684 A1 | 4/2009 | Chinnusamy et al. | |
| 2009/0099992 A1 | 4/2009 | Horvitz | |
| 2009/0210497 A1* | 8/2009 | Callanan | H04L 51/04 709/206 |
| 2009/0300060 A1 | 12/2009 | Beringer et al. | |
| 2010/0011282 A1 | 1/2010 | Dollard et al. | |
| 2010/0023519 A1 | 1/2010 | Kailash et al. | |
| 2010/0024019 A1 | 1/2010 | Backlund | |
| 2010/0037324 A1 | 2/2010 | Grant et al. | |
| 2010/0118700 A1 | 5/2010 | Blum et al. | |
| 2011/0102930 A1 | 5/2011 | Johnston | |
| 2011/0206013 A1 | 8/2011 | Aramoto et al. | |
| 2011/0238862 A1 | 9/2011 | Chaturvedi et al. | |
| 2011/0289037 A1* | 11/2011 | Tullio | G06Q 10/109 706/46 |
| 2012/0001932 A1 | 1/2012 | Burnett et al. | |
| 2012/0079031 A1 | 3/2012 | Matthews et al. | |
| 2012/0137231 A1 | 5/2012 | Maxfield et al. | |
| 2012/0158862 A1 | 6/2012 | Mosko et al. | |
| 2012/0192086 A1* | 7/2012 | Ghods | G06Q 10/10 715/753 |
| 2012/0313785 A1* | 12/2012 | Hanson | G08B 21/24 340/573.1 |
| 2013/0002799 A1 | 1/2013 | Mock | |
| 2013/0078972 A1 | 3/2013 | Levien et al. | |
| 2013/0089187 A1* | 4/2013 | Stahl | H04L 12/1482 379/32.01 |
| 2013/0091286 A1 | 4/2013 | Spencer | |
| 2013/0124669 A1* | 5/2013 | Anderson | G06F 11/3006 709/217 |
| 2013/0138829 A1 | 5/2013 | Bulava | |
| 2013/0321340 A1 | 12/2013 | Seo et al. | |
| 2013/0325934 A1 | 12/2013 | Fausak et al. | |
| 2013/0346329 A1 | 12/2013 | Alib-Bulatao et al. | |
| 2014/0013202 A1 | 1/2014 | Schlumberger | |
| 2014/0043994 A1 | 2/2014 | Bansal et al. | |
| 2014/0095724 A1 | 4/2014 | Yoakum et al. | |
| 2014/0095731 A1 | 4/2014 | Carey et al. | |
| 2014/0108594 A1 | 4/2014 | Siegel et al. | |
| 2014/0126708 A1 | 5/2014 | Sayko | |
| 2014/0126714 A1 | 5/2014 | Sayko | |
| 2014/0126715 A1 | 5/2014 | Lum et al. | |
| 2014/0143823 A1 | 5/2014 | Manchester et al. | |
| 2014/0149512 A1 | 5/2014 | Leitch | |
| 2014/0161237 A1 | 6/2014 | Tolksdorf | |
| 2014/0201820 A1 | 7/2014 | Li et al. | |
| 2014/0219167 A1 | 8/2014 | Santhanam et al. | |
| 2014/0222894 A1 | 8/2014 | Gangadharan et al. | |
| 2014/0222930 A1 | 8/2014 | Gangadharan et al. | |
| 2014/0223452 A1 | 8/2014 | Santhanam et al. | |
| 2014/0237026 A1 | 8/2014 | Khodorenko | |
| 2014/0241215 A1 | 8/2014 | Massover et al. | |
| 2014/0244235 A1 | 8/2014 | Michaelis | |
| 2014/0245143 A1 | 8/2014 | Saint-Marc | |
| 2014/0258822 A1 | 9/2014 | Li et al. | |
| 2014/0269326 A1 | 9/2014 | Westin et al. | |
| 2014/0270104 A1 | 9/2014 | O'Connor | |
| 2014/0280734 A1 | 9/2014 | Chaturvedi et al. | |
| 2014/0282054 A1 | 9/2014 | Yoakum | |
| 2014/0282135 A1 | 9/2014 | Segre | |
| 2014/0282399 A1 | 9/2014 | Gorelik et al. | |
| 2014/0282765 A1 | 9/2014 | Casey et al. | |
| 2014/0282903 A1 | 9/2014 | Singh et al. | |
| 2014/0324979 A1 | 10/2014 | Gao et al. | |
| 2014/0325078 A1 | 10/2014 | Shan et al. | |
| 2014/0344169 A1 | 11/2014 | Phelps et al. | |
| 2014/0348044 A1 | 11/2014 | Narayanan et al. | |
| 2014/0365676 A1 | 12/2014 | Yoakum | |
| 2014/0379931 A1 | 12/2014 | Gaviria | |
| 2015/0002614 A1 | 1/2015 | Zino et al. | |
| 2015/0002619 A1 | 1/2015 | Johnston et al. | |
| 2015/0006610 A1 | 1/2015 | Johnston et al. | |
| 2015/0006611 A1 | 1/2015 | Johnston et al. | |
| 2015/0026473 A1 | 1/2015 | Johnston et al. | |
| 2015/0036690 A1 | 2/2015 | Pastro | |
| 2015/0039687 A1 | 2/2015 | Waxman et al. | |
| 2015/0039760 A1 | 2/2015 | Yoakum | |
| 2015/0052067 A1 | 2/2015 | Thiyagarajan et al. | |
| 2015/0180825 A1 | 6/2015 | Ren et al. | |

FOREIGN PATENT DOCUMENTS

| | | |
|---|---|---|
| CN | 102016816 | 4/2011 |
| EP | 1615386 A1 | 1/2006 |

(56) References Cited

FOREIGN PATENT DOCUMENTS

| | | | |
|---|---|---|---|
| EP | 2529316 | A2 | 12/2012 |
| GB | 2295747 | A | 6/1996 |
| GB | 2468758 | A | 9/2010 |
| GB | 2468759 | A | 9/2010 |
| JP | 2002207683 | A | 7/2002 |
| JP | 2002374318 | A | 12/2002 |
| JP | 2005346556 | A | 12/2005 |
| JP | 2006050407 | A | 2/2006 |
| JP | 2011504665 | A | 2/2011 |
| WO | 2014060008 | A1 | 4/2014 |
| WO | 2014123738 | A1 | 8/2014 |
| WO | 2014190094 | A1 | 11/2014 |
| WO | 2015032277 | A1 | 3/2015 |

OTHER PUBLICATIONS

Andreasen et al., "Session Description Protocol (SDP): Security Descriptions for Media Streams," Network Working Group, Request for Comments: 4568, Standards Track, The Internet Society, Jul. 2006, 40 pages.

Baugher et al., "The Secure Real-time Transport Protocol (SRTP)," Network Working Group, Request for Comments 3711, Standards Track, The Internet Society, Mar. 2004, 51 pages.

Johnston et al., "WebRTC: APIs and RTCWEB Protocols of the HTML5 Real-Time Web," (Book), Second Edition, Smashwords Edition, Digital Codex LLC, Jun. 2013, 254 pages.

Many et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.

McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.

Zimmermann et al., "ZRTP: Media Path Key Agreement for Unicast Secure RTP," Internet Engineering Task Force, Request for Comments: 6189, Informational, IETF Trust, Apr. 2011, 102 pages.

Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.

Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.

Berners-Lee, Tim, "Socially Aware Cloud Storage," Notes on web design, Aug. 17, 2009, http://www.w3.org/DesignIssues/CloudStorage.html, 9 pages.

Chandra, Ramesh et al., "Separating Web Applications from User Data Storage with BStore," presented at the USENIX Conference on Web Application Development, Jun. 2010, Boston, Massachusetts, 13 pages.

Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.

Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.

Hsu, F. et al., "Secure File System Services for Web 2.0 Applications," presented at the ACM Cloud Computing Security Workshop, Nov. 13, 2009, Chicago, Illinois, Association for Computing Machinery, 7 pages.

Joshi, R., "Data-Oriented Architecture: A Loosley Coupled Real-Time SOA," Whitepaper, Aug. 2007, Real-Time Innovations Inc., http://rtcgroup.com/whitepapers/files/RTI_DataOrientedArchitecture_WhitePaper.pdf, 54 pages.

Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.

Non-Final Office Action for U.S. Appl. No. 14/037,440, dated Sep. 12, 2014, 15 pages.

Johnston, Alan et al., "Taking on WebRTC in an Enterprise," IEEE Communications Magazine, Apr. 2013, pp. 48-54, vol. 51, Issue 4.

Search Report for British patent application GB1317121.0 dated Mar. 14, 2014, 3 pages.

Search Report for British patent application GB1317122.8 dated Mar. 11, 2014, 3 pages.

Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.

Search Report for British patent application GB1411584.4 dated Dec. 30, 2014, 4 pages.

Search Report for British patent application GB1411580.2 dated Dec. 30, 2014, 4 pages.

Non-Final Office Action for U.S. Appl. No. 13/931,968, dated Dec. 8, 2014, 6 pages.

Non-Final Office Action for U.S. Appl. No. 13/835,913, dated Nov. 20, 2014, 15 pages.

Non-Final Office Action for U.S. Appl. No. 14/050,891, dated Jan. 29, 2015, 9 pages.

Non-Final Office Action for U.S. Appl. No. 13/955,023, dated Feb. 2, 2015, 12 pages.

Notice of Allowance for U.S. Appl. No. 13/931,968, dated Mar. 23, 2015, 7 pages.

Final Office Action for U.S. Appl. No. 13/835,913, dated Mar. 26, 2015, 17 pages.

Final Office Action for U.S. Appl. No. 14/037,440, dated Feb. 11, 2015, 19 pages.

Non-Final Office Action for U.S. Appl. No. 14/068,839, dated Feb. 20, 2015, 15 pages.

Bergkvist, Adam et al., "WebRTC 1.0: Real-time Communication Between Browsers," W3C Working Draft, Feb. 9, 2012, http://www.w3.org/TR/webrtc/, 42 pages.

Notice of Reason for Refusal for Japanese Patent Application 2013-201228, dated Jun. 11, 2015, 8 pages.

Advisory Action for U.S. Appl. No. 13/835,913, dated Jun. 10, 2015, 3 pages.

Final Office Action and Examiner Initiated Interview for U.S. Appl. No. 14/050,891, dated Jun. 29, 2015, 11 pages.

Final Office Action for U.S. Appl. No. 13/955,023, dated Jul. 20, 2015, 17 pages.

Corrected Notice of Allowability for U.S. Appl. No. 13/944,368, dated Jul. 23, 2015, 4 pages.

Non-Final Office Action for U.S. Appl. No. 14/141,798, dated Jul. 17, 2015, 13 pages.

Barth, A. "The Web Origin Concept," Internet Engineering Task Force (IETF), Request for Comments 6454 (RFC 6454) Dec. 2011, 19 pages, http://www.ietf.org/rfc/rfc6454.txt.

Johnston, A. et al., "An Origin Attribute for the Stun Protocol," Internet Engineering Task Force (IETF), Internet Draft, Jul. 20, 2014, 14 pages, https://tools.ietf.org/html/draft-ietf-tram-stun-origin-00.

Search Report for British Patent Application GB1419338.7, dated Apr. 27, 2015, 4 pages.

Search Report for British Patent Application GB1419334.6, dated Apr. 28, 2015, 6 pages.

Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.

Jesup, R. et al., "DTLS Encapsulation of SCTP Packets for RTCWEB," IETF: Network Working Group, Internet Draft, Feb. 16, 2013, 6 pages.

Rescorla, E., "Security Considerations for RTC-Web," IETF RTCWEB, Internet Draft, Jan. 22, 2013, 16 pages.

Rescorla, E., "WebRTC Security Architecture," IETF RTCWEB, Internet Draft, Jul. 14, 2013, 30 pages.

(56) References Cited

OTHER PUBLICATIONS

Corrected Notice of Allowability for U.S. Appl. No. 13/931,968, dated Apr. 24, 2015, 4 pages.
Advisory Action for U.S. Appl. No. 14/037,440, dated May 20, 2015, 3 pages.
Notice of Allowance for U.S. Appl. No. 13/944,368, dated Apr. 1, 2015, 8 pages.
Non-Final Office Action for U.S. Appl. No. 13/931,967, dated May 5, 2015, 10 pages.
Non-Final Office Action for U.S. Appl. No. 13/931,970, dated May 7, 2015, 9 pages.
Non-Final Office Action for U.S. Appl. No. 13/955,711, dated Nov. 9, 2015, 10 pages.
Notice of Allowance for U.S. Appl. No. 14/050,891, dated Nov. 10, 2015, 10 pages.
Non-Final Office Action for U.S. Appl. No. 13/955,023, dated Dec. 9, 2015, 13 pages.
Non-Final Office Action for U.S. Appl. No. 14/037,440, dated Oct. 22, 2015, 15 pages.
Advisory Action for U.S. Appl. No. 13/931,967, dated Nov. 3, 2015, 3 pages.
Advisory Action for U.S. Appl. No. 13/931,970, dated Nov. 5, 2015, 3 pages.
Non-Final Office Action for U.S. Appl. No. 14/068,943, dated Dec. 2, 2015, 16 pages.
Non-Final Office Action for U.S. Appl. No. 14/255,429, dated Nov. 9, 2015, 26 pages.
Search Report for British Patent Application No. GB1423089.0, dated Jul. 6, 2015, 4 pages.
Non-Final Office Action for U.S. Appl. No. 13/835,913, dated Sep. 3, 2015, 19 pages.
Non-Final Office Action for U.S. Appl. No. 13/912,520, dated Sep. 9, 2015, 21 pages.
Non-Final Office Action for U.S. Appl. No. 13/863,662, dated Sep. 25, 2015, 23 pages.
Advisory Action and Examiner-Initiated Interview Summary for U.S. Appl. No. 14/050,891, dated Sep. 29, 2015, 4 pages.
Final Office Action for U.S. Appl. No. 14/068,839, dated Sep. 9, 2015, 17 pages.
Final Office Action for U.S. Appl. No. 13/931,967, dated Aug. 20, 2015, 12 pages.
Final Office Action for U.S. Appl. No. 13/931,970, dated Aug. 27, 2015, 10 pages.
Examination Report for British Patent Application GB1411584.4, dated Aug. 21, 2015, 1 page.
Examination Report for British Patent Application GB1411580.2, dated Aug. 21, 2015, 1 pages.
Notification of Reasons for Refusal for Japanese Patent Application 2013-201221, dated Aug. 25, 2015, 8 pages.
Extended European Search Report for European Patent Application 15161452.6, dated Jun. 23, 2015, 5 pages.
Author Unknown, "WebRTC," WebRTC.org, Date Accessed: Jan. 26, 2016, 4 pages, http://webrtc.org/.
Notice of Allowance for U.S. Appl. No. 13/863,662, dated Feb. 1, 2016, 17 pages.
Advisory Action and Examiner-Initiated Interview Summary for U.S. Appl. No. 14/068,839, dated Feb. 12, 2016, 4 pages.
Final Office Action for U.S. Appl. No. 14/141,798, dated Dec. 24, 2015, 10 pages.
Non-Final Office Action for U.S. Appl. No. 14/174,371, dated Feb. 18, 2016, 18 pages.
Non-Final Office Action for U.S. Appl. No. 13/931,970, dated Feb. 23, 2016, 11 pages.
Official Action with English Translation for China Patent Application No. 201310670422.5, dated Apr. 28, 2017 17 pages.
Official Action for United Kingdom Patent Application No. GB1317122.8, dated Aug. 15, 2017 4 pages.
Official Action with English Translation for German Patent Application No. 102013110574.2, dated Mar. 9, 2018 9 pages.
Official Action for United Kingdom Patent Application No. GB1317122.8, dated Apr. 16, 2018 4 pages.

* cited by examiner

INTELLIGENT NOTIFICATION OF REQUESTS FOR REAL-TIME ONLINE INTERACTION VIA REAL-TIME COMMUNICATIONS AND/OR MARKUP PROTOCOLS, AND RELATED METHODS, SYSTEMS, AND COMPUTER-READABLE MEDIA

PRIORITY APPLICATION

The present application claims priority to U.S. Provisional Patent Application Ser. No. 61/706,951 filed on Sep. 28, 2012, and entitled "ENTERPRISE COMMUNICATIONS AND COLLABORATION SYSTEMS BASED ON REAL-TIME COMMUNICATIONS AND/OR MARKUP PROTOCOLS, AND RELATED METHODS, APPARATUSES, AND COMPUTER-READABLE MEDIA," which is hereby incorporated herein by reference in its entirety.

BACKGROUND

Field of the Disclosure

The technology of the disclosure relates generally to intelligent notification of requests for real-time online interactions.

Technical Background

As capabilities of smart endpoints continue to advance at an unprecedented pace, models of richer interaction are evolving and new models are emerging. One such model is an Internet-centric model that handles voice and video as merely another type of network flow. Browser applications available on virtually all Internet connected devices may provide a rich set of real-time media capabilities through use of real-time communications and/or markup protocols, in particular the Web Real-Time Communications standard (WebRTC) and the HyperText Markup Language 5 (HTML5). Together, WebRTC and HTML5 enable a device to establish a media flow directly with another device to enable real-time interactive video, voice, textual media, and/or data interchanges. In this manner, the Internet-centric WebRTC/HTML5 model offers real-time communications capabilities for online collaboration.

The Internet-centric WebRTC/HTML5 model is based on an offer/answer exchange paradigm for establishing a real-time communications session between two devices. In the offer/answer exchange paradigm, a first device sends an "offer" to establish a real-time communications session to a second device. The offer specifies the media types and capabilities that the first device supports and prefers for use in the real-time communications session. The second device then responds with an "answer" that indicates which of the offered media types and capabilities are supported and acceptable for the real-time communications session. Once the offer/answer exchange is complete, the devices may then establish a direct "peer connection" with one another, and may begin an exchange of media or data packets constituting the real-time communications. Such interactions operate according to a "meet me" paradigm, wherein two or more devices seeking real-time online interaction typically must access a WebRTC/HTML5 web application or other real-time-communications-enabled web application at the same time. Thus, to enable interaction between a requestor and a recipient, a notification must be sent to the recipient indicating that a real-time online interaction is desired by the requestor. However, a notification sent with no consideration as to what activity the recipient is currently, or will soon be, engaged in may result in the notification arriving at an inopportune time for the recipient. This may cause distraction, embarrassment, or aggravation on the part of the recipient.

SUMMARY OF THE DETAILED DESCRIPTION

Embodiments of the disclosure provide intelligent notification of requests for real-time online interaction. Related methods, systems, and computer-readable media are also disclosed. As used herein, a real-time online interaction includes any real-time interactive video, voice, textual media, and/or data interchange between or among two or more parties, based on real-time communications and/or markup protocols, such as WebRTC/HTML5. In this regard, in one embodiment, a method for intelligently processing a request for real-time online interaction is provided. The method comprises receiving, by a computing device, a request for real-time online interaction directed to a recipient identifier associated with a recipient device of a recipient and originating from a requestor device of a requestor. The method further comprises determining, by the computing device, an interruption indicator that indicates a recipient activity priority relative to a delivery priority of the request for real-time online interaction. The method additionally comprises delivering a notification of the request for real-time online interaction to the recipient device of the recipient, responsive to the interruption indicator indicating that the delivery priority of the request for real-time online interaction exceeds the recipient activity priority. In this manner, unnecessary interruption of the recipient may be minimized while assuring timely notification of important requests for real-time online interaction, and appropriate handling of all requests for real-time online interaction.

In another embodiment, a system for providing intelligent notification of a request for real-time online interaction is provided. The system comprises at least one communications interface, and an intelligent notification agent associated with the at least one communications interface. The intelligent notification agent is configured to receive a request for real-time online interaction directed to a recipient identifier associated with a recipient device of a recipient and originating from a requestor device of a requestor. The intelligent notification agent is further configured to determine an interruption indicator that indicates a recipient activity priority relative to a delivery priority of the request for real-time online interaction. The intelligent notification agent is additionally configured to deliver a notification of the request for real-time online interaction to the recipient device of the recipient, responsive to the interruption indicator indicating that the delivery priority of the request for real-time online interaction exceeds the recipient activity priority.

In another embodiment, a non-transitory computer-readable medium is provided. The non-transitory computer-readable medium has stored thereon computer-executable instructions to cause a processor to implement a method comprising receiving a request for real-time online interaction directed to a recipient identifier associated with a recipient device of a recipient and originating from a requestor device of a requestor. The method implemented by the computer-executable instructions further comprises determining an interruption indicator that indicates a recipient activity priority relative to a delivery priority of the request for real-time online interaction. The method implemented by the computer-executable instructions additionally comprises delivering a notification of the request for real-time online interaction to the recipient device of the recipient, responsive to the interruption indicator indicating that the delivery priority of the request for real-time online interaction exceeds the recipient activity priority.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
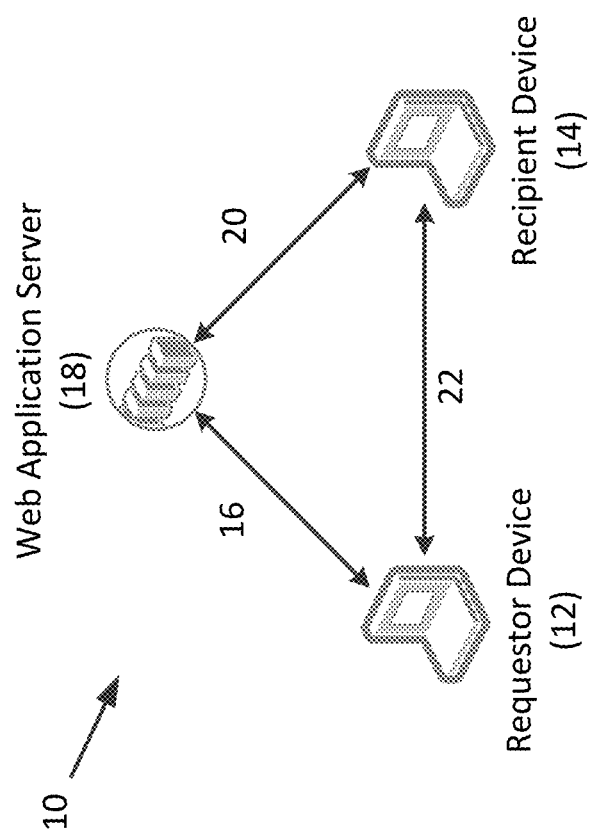
FIG. 1 is a conceptual diagram showing a conventional implementation of a system for real-time online interaction employing a WebRTC/HTML5 model.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments of the disclosure provide intelligent notification of requests for real-time online interaction. Related methods, systems, and computer-readable media are also disclosed. As used herein, a real-time online interaction includes any real-time interactive video, voice, textual media, and/or real-time data interchange between or among two or more parties, based on real-time communications and/or markup protocols, such as WebRTC/HTML5. In this regard, in one embodiment, a method for intelligently processing a request for real-time online interaction is provided. The method comprises receiving, by a computing device, a request for real-time online interaction directed to a recipient identifier associated with a recipient device of a recipient and originating from a requestor device of a requestor. The method further comprises determining, by the computing device, an interruption indicator that indicates a recipient activity priority relative to a delivery priority of the request for real-time online interaction. The method additionally comprises delivering a notification of the request for real-time online interaction to the recipient device of the recipient, responsive to the interruption indicator indicating that the delivery priority of the request for real-time online interaction exceeds the recipient activity priority. In this manner, unnecessary interruption of the recipient may be minimized while assuring timely notification of important requests for real-time online interaction, and appropriate handling of all requests for real-time online interaction.

Before examples of methods, systems, and computer-readable media for intelligent notification of requests for real-time online interaction are discussed, a conventional system for real-time online interaction is described and contrasted with an exemplary system providing intelligent notification as disclosed herein. In this regard, FIG. 1 illustrates a conventional system for real-time online interaction based on real-time communications and/or markup protocols, while FIG. 2 illustrates an exemplary intelligent notification system, respectively.

Figure 2:
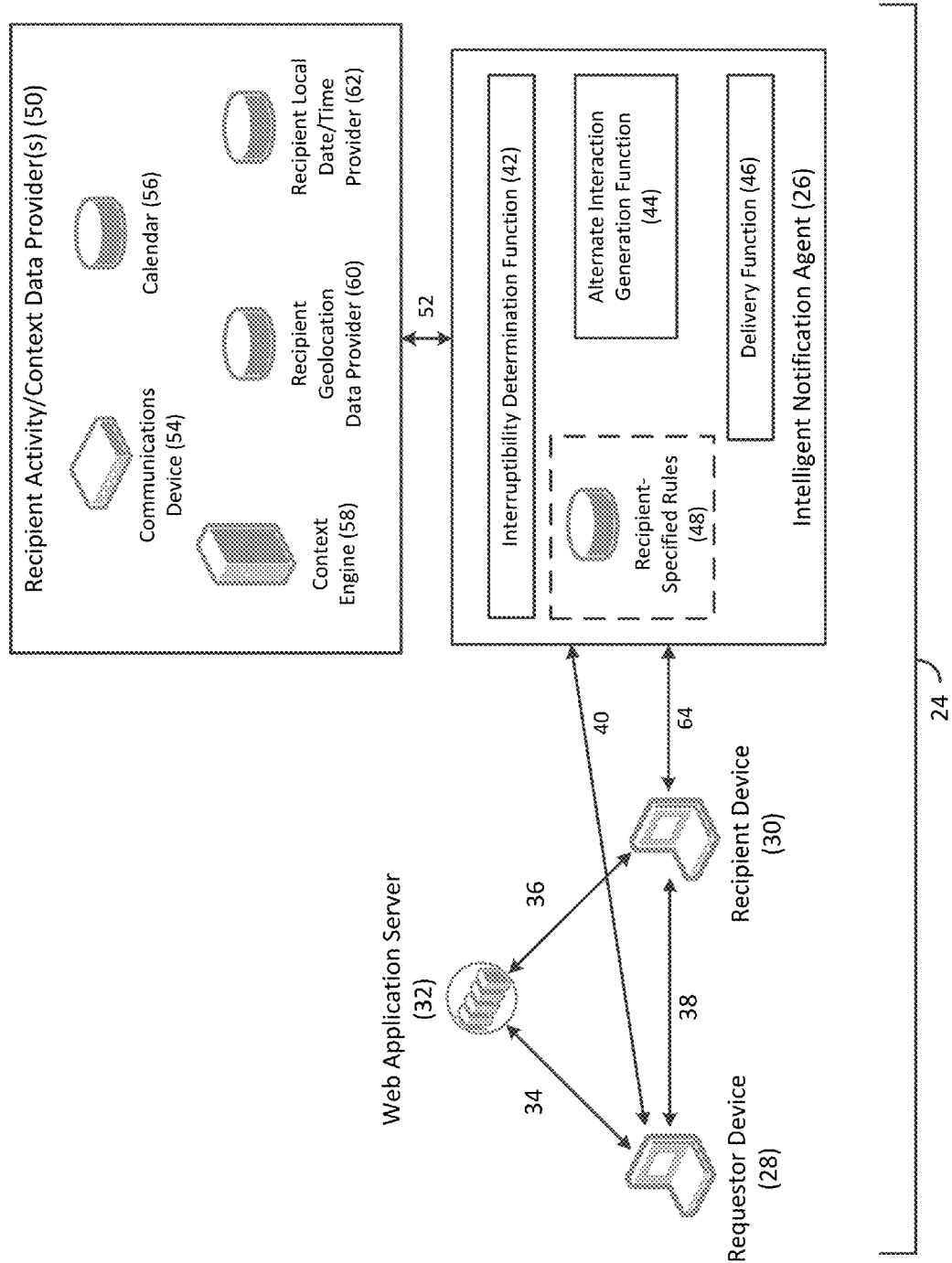
FIG. 2 is a block diagram of an exemplary system that includes an intelligent notification agent configured to provide intelligent notification of requests for real-time online interaction.

In an exemplary system 10 of FIG. 1, a requestor device 12 of a requestor (not shown) and a recipient device 14 of a recipient (not shown) represent computing devices that are each capable of participating in a real-time online interaction based on real-time communications and/or markup protocols. As used herein, the term "requestor" refers to a party or entity initiating a request for a real-time online interaction, and the term "recipient" indicates the party or entity that is the target of the request for real-time online interaction. By way of example, computing devices such as the requestor device 12 and/or the recipient device 14 may be a cellular phone, smartphone, tablet, desktop or laptop computer, or other communications devices supporting real-time communications and/or markup protocols. Some embodiments may provide that the requestor device 12 and/or the recipient device 14 execute a desktop or mobile browser application, such as Google Chrome™, Mozilla Firefox®, Microsoft Internet Explorer®, or Apple Safari®, or other desktop or mobile software providing support for real-time communications and/or markup protocols. In the example discussed in FIG. 1, real-time communications and/or markup protocols used to establish the real-time online interaction are assumed to be WebRTC/HTML5. The real-time online interaction may include an exchange of real-time video communications, voice communications, textual media communications, and/or data interchange.

As indicated by a communications link 16, the requestor device 12 is communicatively and bidirectionally coupled to a web application server 18, which hosts a WebRTC/HTML5 application (not shown) that is accessible via a computer network, such as the Internet or an enterprise intranet. Likewise, the recipient device 14 is also communicatively and bidirectionally coupled to the web application server 18 via a communications link 20. It is to be understood that the web application server 18 may represent a web application server with which both the requestor device 12 and the recipient device 14 communicate. In some embodiments, the web application server 18 may collectively represent first and second web application servers with which the requestor device 12 and the recipient device 14 respectively communicate, and which are further communicatively coupled to each other.

The requestor device 12 and the recipient device 14 may each request and download the WebRTC/HTML5 application from the web application server 18 via the communication links 16 and 20, respectively. The WebRTC/HTML5 application may include, for example, a dynamically-generated rich user interface and control logic implemented using HTML5 and a scripting language, such as JavaScript. Instances of the WebRTC/HTML5 application executing on the requestor device 12 and the recipient device 14 may then establish a real-time media flow 22, via WebRTC, directly with one another. Thus, in this example, WebRTC may enable high-definition audio and video communications to flow directly to and from the requestor device 12 and the recipient device 14 via the real-time media flow 22, while HTML5 provides client-side scripting functionality (using, e.g., JavaScript) for generating a rich user interface and enabling asynchronous communications with the web application server 18.

Those of skill in the art will recognize that the real-time online interaction model described herein is based on an offer/answer exchange paradigm. In the offer/answer exchange paradigm, the requestor device 12 sends an "offer" to establish a real-time communications session to the recipient device 14. The offer specifies the media types and capabilities that the requestor device 12 supports and prefers for use in the real-time communications session. The recipient device 14 then responds with an "answer" that indicates which of the offered media types and capabilities are supported and acceptable for the real-time communications session. Such interactions operate according to a "meet me" paradigm, wherein the requestor device 12 and the recipient device 14 typically must access a WebRTC/HTML5 web application or other real-time-communications-enabled web application at the same time. To enable interaction between a requestor and a recipient, therefore, a notification must be sent to the recipient indicating that a real-time online interaction is desired by the requestor. However, a notification sent with no consideration as to what activity the recipient is currently, or will soon be, engaged in may result in the notification arriving at an inopportune time for the recipient. This may cause distraction, embarrassment, or aggravation on the part of the recipient.

In this regard, FIG. 2 illustrates an exemplary system 24, including an intelligent notification agent 26 configured to provide intelligent notification of requests for real-time online interaction. The system 24 includes a requestor device 28 of a requestor (not shown), a recipient device 30 of a recipient (not shown), and a web application server 32, corresponding to the requestor device 12, the recipient device 14, and the web application server 18, respectively, of FIG. 1. The requestor device 28 and the recipient device 30 are each communicatively coupled to a web application server 32 via bidirectional communications links represented by arrows 34 and 36, respectively. The web application server 32 may represent a web application server with which both the requestor device 28 and the recipient device 30 communicate. In some embodiments, the web application server 32 may collectively represent first and second web application servers with which the requestor device 28 and the recipient device 30 respectively communicate, and which are further communicatively coupled to each other. The requestor device 28 and the recipient device 30 are also capable of establishing a real-time media flow 38 directly with one another using real-time communications and/or markup protocols.

The system 24 further provides an intelligent notification agent 26. Some embodiments may provide that the intelligent notification agent 26 comprises a standalone system, while in some embodiments the intelligent notification agent 26 comprises elements incorporated into the requestor device 28, the recipient device 30, and/or the web application server 32. The intelligent notification agent 26 is provided to intelligently generate a notification of a request for real-time online interaction based upon an awareness of a current or future activity of the recipient, and the interruptibility of the recipient's activity. The intelligent notification agent 26 is communicatively coupled to the requestor device 28 via a communications link 40, such that a request from the requestor device 28 for real-time online interaction directed to a recipient identity associated with the recipient device 30 is received by the intelligent notification agent 26. The intelligent notification agent 26 provides an interruptibility determination function 42, an alternate interaction generation function 44, a delivery function 46, and optional recipient-specified rules 48. The functionality of each of these elements is described in more detail below with respect to FIGS. 4A and 4B and FIGS. 5A-5D.

The intelligent notification agent 26 is also communicatively coupled to one or more recipient activity/context data providers 50 via a communications link 52. The recipient activity/context data providers 50 may generate, store, and/or provide data enabling the intelligent notification agent 26 to detect indicia representing activities in which the recipient is currently engaged or soon will be engaged, as well as other context information regarding the recipient's activities and the requested real-time interaction. As used herein, "context" refers to additional data or metadata regarding the recipient's activity or the request for real-time online interaction that may allow a priority of recipient activity and/or a priority of delivery of the request for real-time online interaction to be assessed. Exemplary recipient activity/context data providers 50 may include but are not limited to a communications device 54, a calendar 56, a context engine 58, a recipient geolocation data provider 60, and/or a recipient local date/time provider 62. It is to be understood that, in some embodiments, the calendar 56 may comprise a shared calendar system used by both the requestor and the recipient. The operation of the recipient activity/context data providers 50 and their interaction with the intelligent notification agent 26 are discussed in greater detail below with respect to FIGS. 4A and 4B and FIGS. 5A-5D.

The intelligent notification agent 26 is further communicatively coupled to the recipient device 30 via a communications link 64. Through the communications link 64, the intelligent notification agent 26 may deliver a notification of a request for real-time online interaction to the recipient device 30. The intelligent notification agent 26 may also receive data from the recipient device 30, such as data related to usage of the recipient device 30, usage of software applications by the recipient device 30, network connectivity and active media or data flows, motion sensing, and/or audio/image/video input and recognition.

In some embodiments, the requestor device 28 of a requestor (not shown) may attempt to establish an interactive communication by requesting and downloading a real-time online interaction application (such as a WebRTC/HTML5 application) from the web application server 32 via the communications link 34. The requestor device 28 may then transmit a request for a real-time online interaction, directed to a recipient identifier associated with the recipient device 30 of a recipient (not shown), to the intelligent notification agent 26. Some embodiments may provide that the request is generated by the real-time online interaction application, while in some embodiments the request may be generated by a plug-in or extension of a web client or browser on the requestor device 28. The intelligent notification agent 26 receives and analyzes data from the recipient activity/context data provider(s) 50 in order to detect indicia representing the recipient's activity as well as context information regarding the recipient's activity and the request for real-time interaction.

Based on an analysis of the detected indicia and context information, the intelligent notification agent 26 may determine whether the detected indicia indicate that an activity in which the recipient is currently engaged, or soon to be engaged, should be prioritized over an immediate delivery of the request for real-time online interaction. If not (i.e., if the recipient's activity may be interrupted), then a notification of the request for real-time online interaction is delivered immediately to the recipient device 30. In some embodiments, the notification may include an identifier for the sender, an urgency of the request, and/or some other categorization of the request. Once notified, the recipient may choose to participate in the real-time online interaction by, for example, requesting and downloading the real-time online interaction application from the web application server 32 to the recipient device 30 via the communications link 36. The requestor device 28 and the recipient device 30, each executing the real-time online interaction application, may then establish a real-time media flow 38 directly with one another.

Alternatively, if the recipient's activity is prioritized over delivery of a notification of the request for real-time online interaction, then the intelligent notification agent 26 may provide the requestor device 28 with one or more options for an alternate interaction with the recipient. The intelligent notification agent 26 may evaluate one or more scheduled activities of the recipient and/or one or more scheduled activities of the requestor, and determine a time period available for an alternate interaction. The time period may then be provided to the requestor device 28 as a suggested time for the alternate interaction. In some embodiments, the intelligent notification agent 26 may also suggest an alternate form of interaction, such as a Short Messaging Service (SMS) messaging session, a Multimedia Messaging Service (MMS) messaging session, an Instant Messaging (IM) messaging session, a voice message, a video message, an email, or some other form of interaction with the recipient. In this manner, the intelligent notification agent 26 may automatically minimize any unnecessary interruption of the recipient while assuring timely delivery of requests for real-time online interaction, and appropriate handling of all requests for real-time online interaction.

Figure 3:
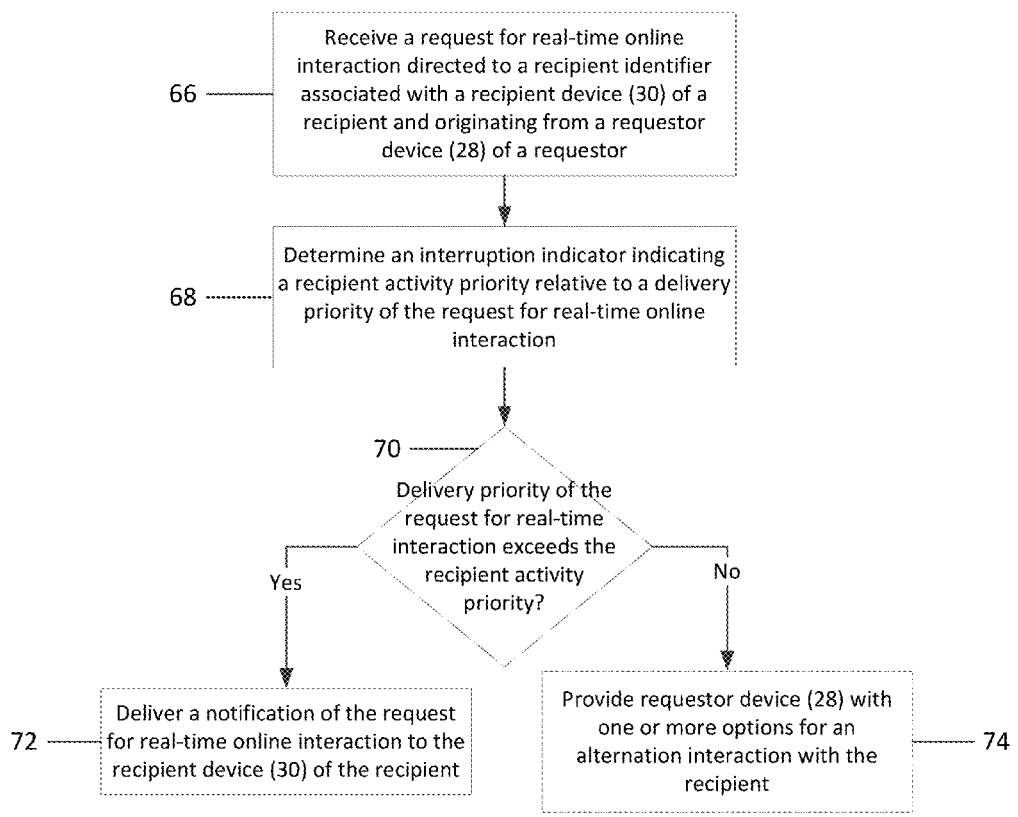
FIG. 3 is a flowchart illustrating exemplary functions for intelligent notification of requests for real-time online interaction.

To generally describe exemplary operations of the intelligent notification agent 26 of FIG. 2 for intelligent notification of requests for real-time online interaction, FIG. 3 is provided with further reference to FIG. 2. In this example, operations begin with the intelligent notification agent 26 receiving a request for real-time online interaction directed to a recipient identifier associated with a recipient device 30 of a recipient and originating from a requestor device 28 of a requestor (block 66). The intelligent notification agent 26 determines an interruption indicator that indicates a recipient activity priority relative to a delivery priority of the request for real-time online interaction (block 68). In some embodiments, the recipient activity priority and the delivery priority of the request for real-time online interaction may be determined by the interruptibility determination function 42 of the intelligent notification agent 26 based on indicia such as data representing an activity of the recipient, the activity context, and the context of the request for real-time online interaction. For example, the interruptibility determination function 42 may assign a weight to each of various potential recipient activities, activity contexts, and/or contexts for requests for real-time online interaction, and may determine the recipient activity priority and the delivery priority based on evaluation of the assigned weights. In some embodiments, the interruption indicator may be further based on optional recipient-specified rules 48.

The intelligent notification agent 26 next evaluates whether the delivery priority of the request for real-time online interaction exceeds the recipient activity priority, based on the interruption indicator (block 70). If the interruption indicator indicates that the delivery priority of the request for real-time online interaction exceeds the recipient activity priority (i.e., the recipient activity may be interrupted), the intelligent notification agent 26 immediately delivers a notification of the request for real-time online interaction to the recipient device 30 of the recipient (block 72). According to some embodiments, the notification is delivered to the recipient device 30 by the delivery function 46 of the intelligent notification agent 26.

Returning to decision block 70 of FIG. 3, if the interruption indicator indicates that the recipient activity priority exceeds that of the delivery priority of the request for real-time online interaction, then the recipient activity is not interrupted. Instead, in some embodiments, the intelligent notification agent 26 may optionally provide the requestor device 28 with one or more options for an alternative interaction with the recipient (block 74). In such embodiments, the one or more options for alternative interaction may be determined by the alternate interaction determination function 44 of the intelligent notification agent 26.

Figure 4A:
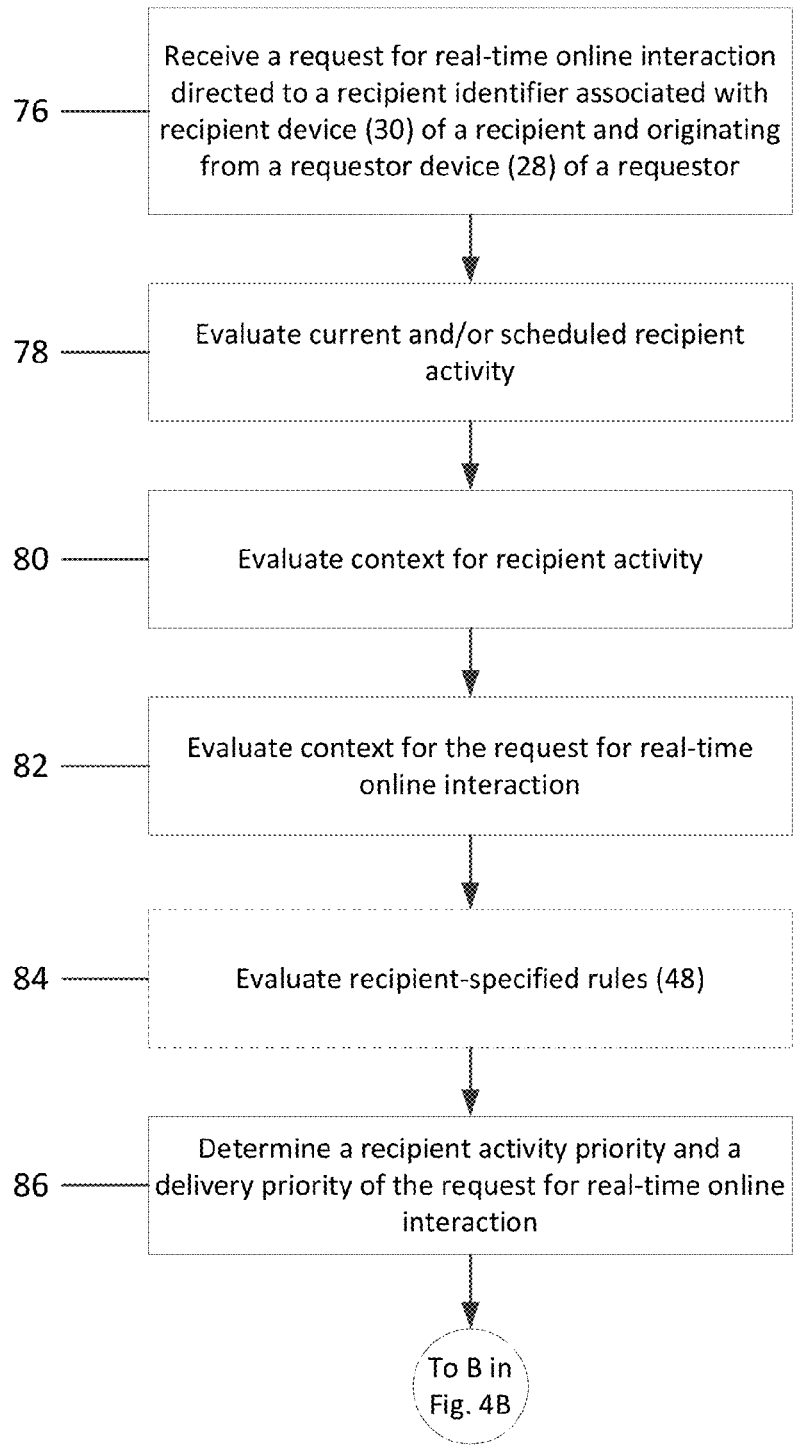
FIGS. 4A and 4B are flowcharts illustrating more detailed exemplary functions for intelligent notification of a request for real-time online interaction based on indicia such as data representing a recipient activity, a context for the recipient activity, and a context for the request for real-time online interaction.
Figure 4B:
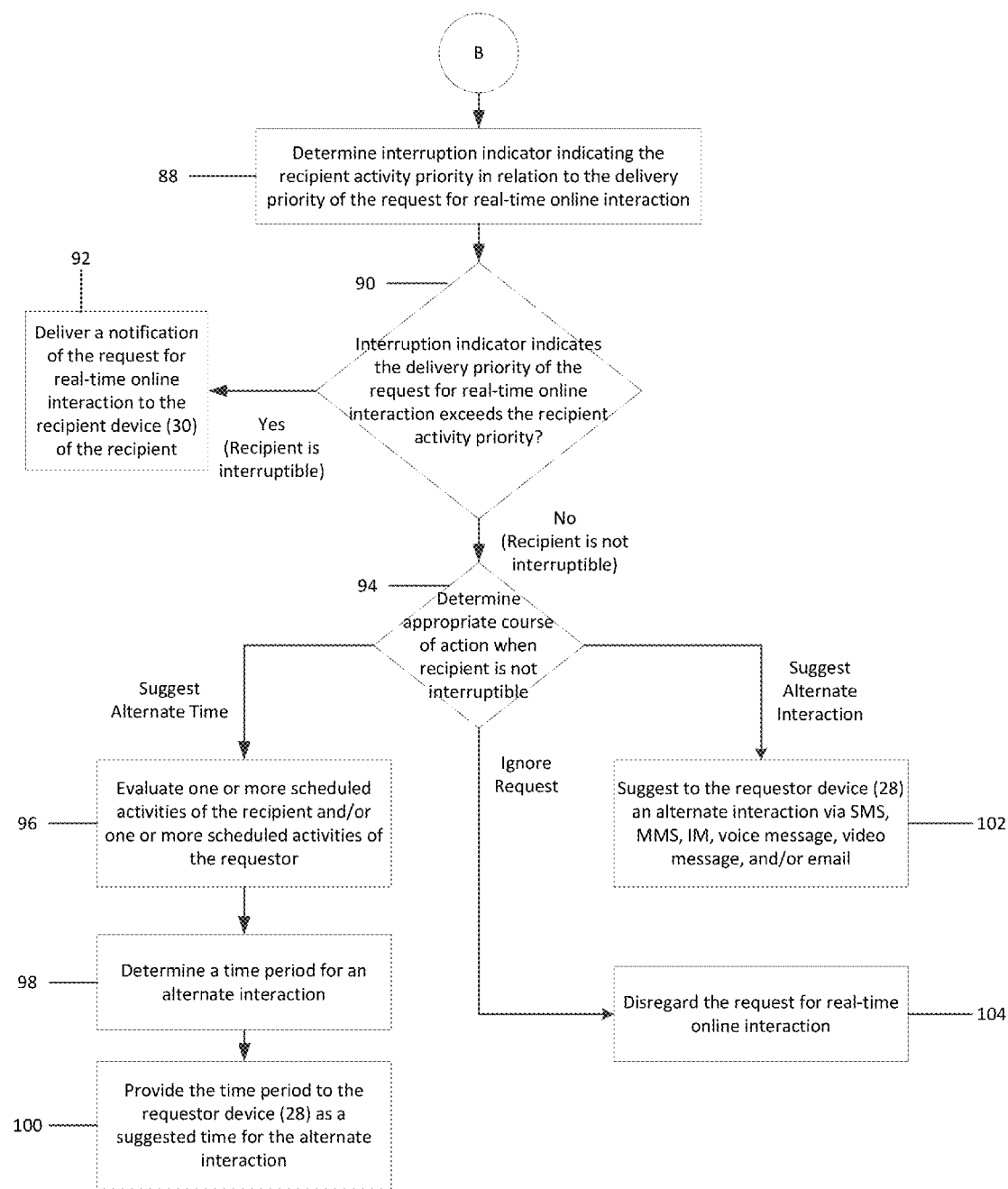

FIGS. 4A and 4B are provided to illustrate in more detail an exemplary generalized process for an intelligent notification agent configured to determine an interruption indicator, and to deliver a notification of a request for real-time online interaction or options for alternative interaction. FIG. 4A details a process for receiving a request for real-time online interaction, and evaluating data to determine a recipient activity priority and a delivery priority of the request for real-time online interaction. FIG. 4B shows operations for determining an interruption indicator, and, based on the interruption indicator, either delivering a notification of the request for real-time online interaction or determining options for alternative interaction. For illustrative purposes, FIGS. 4A and 4B refer to elements of the exemplary system 24 and the intelligent notification agent 26 of FIG. 2.

Referring now to FIG. 4A, the intelligent notification agent 26 receives a request for real-time online interaction directed to a recipient identifier associated with a recipient device 30 of a recipient and originating from a requestor device 28 of a requestor (block 76). The intelligent notification agent 26 then detects indicia of an activity in which the recipient is currently engaged or soon to be engaged (block 78). In some embodiments, indicia representing a recipient's activity may be directly or indirectly inferred based on data obtained by the intelligent notification agent 26 from the one or more recipient activity/context data provider(s) 50. For instance, the calendar 56 may provide data regarding scheduled activities for the recipient and information related to other participants taking part in the recipient's scheduled activities.

The intelligent notification agent 26 next determines a context for the activity of the recipient (block 80). In some embodiments, the context for the activity of the recipient may be determined based on data obtained by the intelligent notification agent 26 from the one or more recipient activity/context data provider(s) 50. By way of non-limiting example, the recipient geolocation data provider 60 and the recipient local date/time provider 62 may provide information regarding the recipient's current location and local time, respectively. In some embodiments, the context for the activity of the recipient may also be determined based on data regarding scheduled activities for the requestor obtained from the calendar 56. Some embodiments may provide that the context for the recipient's activity may be detected based on data obtained from the recipient device 30, such as information related to presence, availability, location, device usage, motion sensing, network connectivity and media or data flows, audio detection, and/or image analysis. Those skilled in the art will recognize that other data provider(s) may serve as sources of data useful for determining the context for the activity of the recipient, all of which are intended to be included within the scope of this disclosure.

Further referring to FIG. 4A, the intelligent notification agent 26 then determines a context for the request for real-time online interaction (block 82). Some embodiments may provide that the context for the request for real-time online interaction may include determining an identity of the requestor. For instance, the intelligent notification agent 26 may determine whether the requestor is an actual human being, a system acting on behalf of a human originator (e.g., Twitter or Facebook), an application providing application-specific data (for example, a bank alert), or a device (such as a security camera that has sensed motion). Some embodiments may provide that an identity of the requestor may be determined by examining the originating address of the request for real-time online interaction and/or by examining a requestor identifier associated with the requestor device 28.

In some embodiments, the context for the request for real-time online interaction may be determined by the intelligent notification agent 26 based on a relationship between the requestor and the intended recipient, and/or a history of interactions between the requestor and the recipient. Insight into the relationship and interactions between the requestor and the recipient may be provided by one of the recipient activity/context data provider(s) 50, such as the context engine 58. According to some embodiments, the context for the request for real-time online interaction may be determined based on a current or scheduled activity of the requestor. Some embodiments may provide that the intelligent notification agent 26 may evaluate data related to the requestor's interactions with the web application server 32 in determining the context for the request for real-time online interaction. Examples of data related to the requestor's interactions with the web application server 32 may include website "breadcrumbs," cookies, and navigation history.

With continuing reference to FIG. 4A, the intelligent notification agent 26 next may optionally evaluate recipient-specified rules 48 that indicate recipient preferences with respect to notification of requests for real-time online interaction (block 84). For example, the recipient-specified rules 48 may specify that requests for real-time online interaction from a spouse or a supervisor are to be automatically given a higher notification delivery priority, while requests for real-time online interaction sent at night or on a weekend are to be automatically given a lower notification delivery priority. It is to be understood that, in determining notification of requests for real-time online interaction will be delivered, the intelligent notification agent 26 may evaluate the recipient-specified rules 48 in conjunction with other indicia as discussed above, such as data representing the activity of the recipient, the context of the recipient's activity, and/or the context for the request for real-time online interaction.

The intelligent notification agent 26 determines a priority of the detected indicia representing the activity of the recipient and a delivery priority of the request for real-time online interaction (block 86). In some embodiments, the recipient activity priority and the delivery priority of the request for real-time online interaction may be determined by the interruptibility determination function 42 of the intelligent notification agent 26 based on indicia such as data representing an activity of the recipient, the activity context, and the context of the request for real-time online interaction. For example, the interruptibility determination function 42 may assign a weight to each of various potential recipient activities, activity contexts, and/or contexts for requests for real-time online interaction, and may determine the recipient activity priority and the delivery priority based on evaluation of the assigned weights.

Referring now to FIG. 4B, the intelligent notification agent 26 determines an interruption indicator that indicates the recipient activity priority in relation to the delivery priority of the request for real-time online interaction (block 88). The intelligent notification agent 26 then determines whether the interruption indicator indicates that the delivery priority of the request for real-time online interaction exceeds the recipient activity priority (block 90). If so (i.e., if the activity of the recipient may be interrupted), the intelligent notification agent 26 delivers a notification of the request for real-time online interaction to the recipient device 30 of the recipient (block 92). In some embodiments, delivery of the notification may include an optional evaluation of recipient-specified rules 48 indicating recipient preferences with respect to delivery of notification of requests (e.g., whether the notification should be indicated by an audio alert, a visual alert, and/or a tactile alert).

If the intelligent notification agent 26 ascertains at decision block 90 of FIG. 4B that the recipient activity priority exceeds the delivery priority of the request for real-time online interaction, the intelligent notification agent 26 determines an appropriate course of action (block 94). Some embodiments may provide that determining an appropriate course of action may be based on an optional evaluation of recipient-specified rules 48. In some embodiments, the intelligent notification agent 26 may decide to provide one or more options for an alternate interaction time. In this regard, the intelligent notification agent 26 attempts to determine a suitable time for an alternate interaction by evaluating one or more scheduled activities of the recipient and/or one or more scheduled activities of the requestor (block 96). Some embodiments may provide that scheduled activities of the recipient and/or the requestor may be determined based upon an evaluation of data received from a calendar, such as the calendar 56, or on data obtained from the recipient device 30 and/or the requestor device 28. If the recipient and the requestor make use of a shared calendaring system, the intelligent notification agent 26 may evaluate one or more scheduled activities of the requestor and one or more scheduled activities of the recipient to determine a mutually agreeable time during which both the recipient and the requestor are available for an alternate interaction. Based on the evaluation of scheduled activities, the intelligent notification agent 26 determines a time period for an alternate interaction (block 98). The intelligent notification agent 26 then provides the determined time period to the requestor device 28 as a suggested time for the alternate interaction (block 100).

The intelligent notification agent 26 may decide at block 94 to provide the requestor device 28 with one or more options for an alternate interaction type. Accordingly, the intelligent notification agent 26 suggests to the requestor device 28 an alternate type of interaction, such as an SMS messaging session, an MMS messaging session, an IM messaging session, a voice message, a video message, an email, or some other form of interaction with the recipient (block 102). In some embodiments, the intelligent notification agent 26 may decide at block 94 to ignore the request for real-time online interaction. In this case, the request for real-time online interaction is simply disregarded (block 104).

Figure 5A:
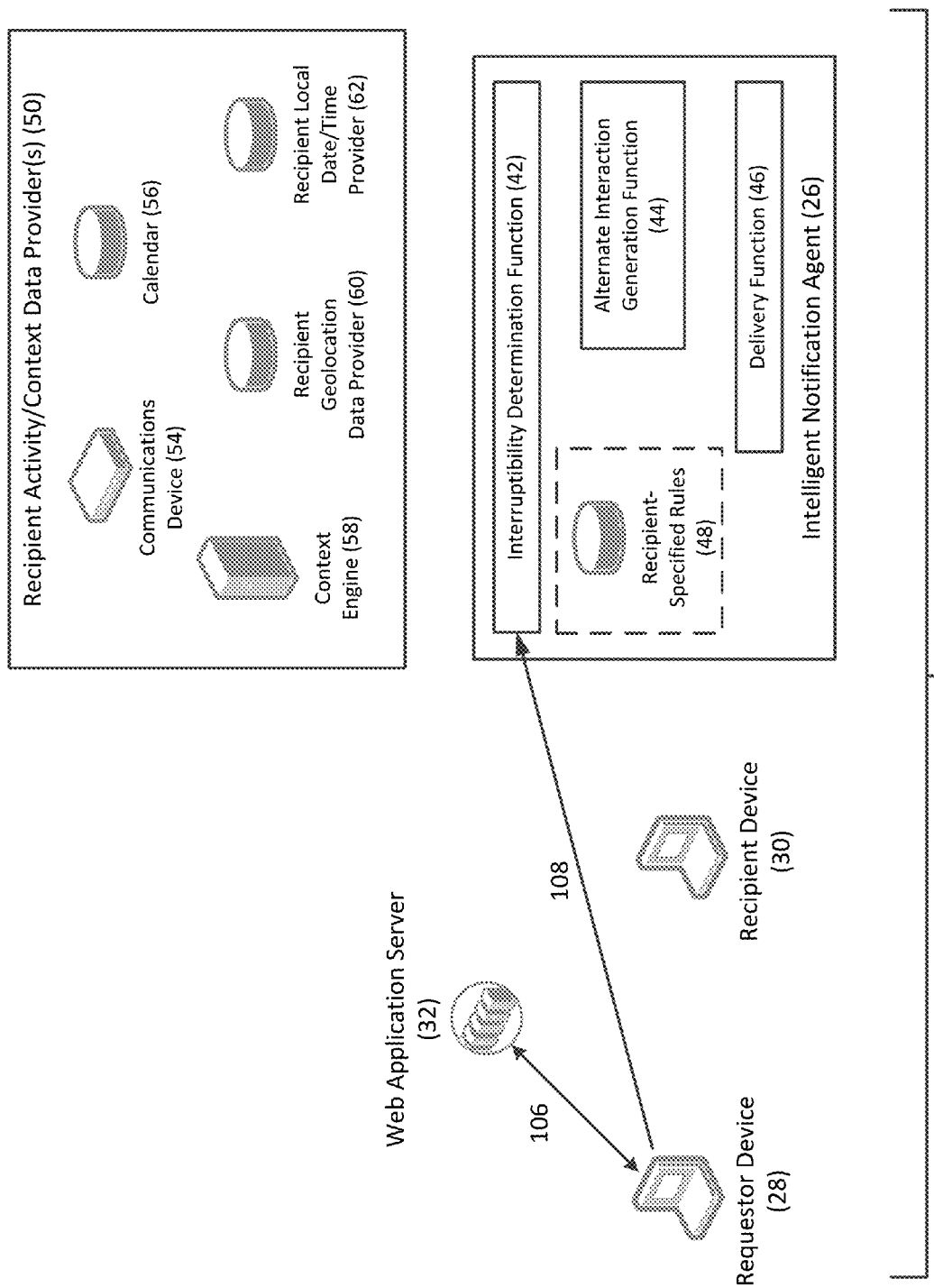
FIGS. 5A-5D are block diagrams illustrating exemplary communications flows within an exemplary system including an intelligent notification agent configured to provide intelligent notification of requests for real-time online interaction.

To illustrate exemplary communications flows within an exemplary system including an intelligent notification agent configured to provide intelligent notification of requests for real-time online interaction, FIGS. 5A-5D are provided. For illustrative purposes, FIGS. 5A-5D refer to elements of the exemplary system 24 and the intelligent notification agent 26 of FIG. 2. Referring now to FIG. 5A, the requestor device 28 requests and downloads a real-time online interaction application from the web application server 32, as indicated by arrow 106. The requestor device 28 then transmits a request for real-time online interaction, directed to a recipient identifier associated with the recipient device 30, to the interruptibility determination function 42 of the intelligent notification agent 26, as indicated by arrow 108.

Figure 5B:
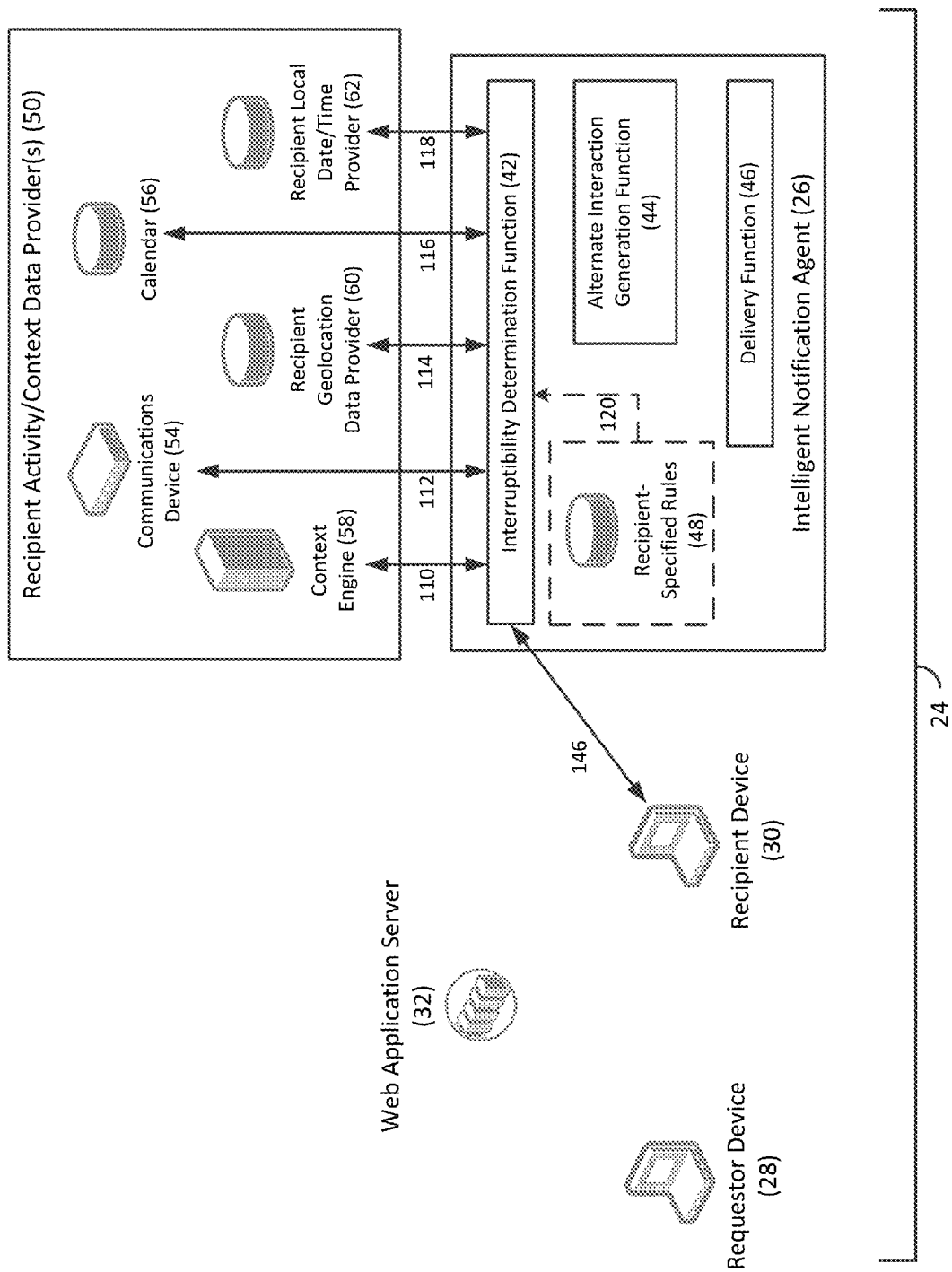

As shown in FIG. 5B, the interruptibility determination function 42 of the intelligent notification agent 26 exchanges data with one or more recipient activity/context data providers 50. The data received by the interruptibility determination function 42 from the recipient activity/context data providers 50 may be relevant to a current or future activity of the recipient, a context for the recipient's activity, and/or a context for the request for real-time online interaction. For example, in some embodiments, the context engine 58 may provide data regarding a relationship between the requestor and the intended recipient, and/or a history of interactions between the requestor and the intended recipient, as indicated by arrow 110. The communications device 54 may comprise, as non-limiting examples, a communications bridge, a media server, a communications client, a dedicated communications device, and/or a smartphone. The communications device 54 may provide information including historical data regarding interactions between the requestor and the intended recipient, as indicated by arrow 112. Some embodiments may provide that the recipient's location and/or motion may be provided by the recipient geolocation data provider 60, as illustrated by arrow 114. Information related to activities in which the recipient and/or the requestor is currently engaged or soon will be engaged may be provided by the calendar 56, as indicated by arrow 116. The local date and time for the recipient may be provided by the recipient local date/time provider 62, as shown by arrow 118.

In some embodiments, the interruptibility determination function 42 of the intelligent notification agent 26 may optionally receive recipient-specified rules 48 indicating the recipient's preferences, as represented by arrow 120. The recipient-specified rules 48 may provide insight into interruption preferences set by the recipient. In some embodiments, the interruptibility determination function 42 of the intelligent notification agent 26 may further receive data from the recipient device 30, as indicated by arrow 122. For example, the interruptibility determination function 42 may receive data related to usage of the recipient device 30, usage of software applications on the recipient device 30, network connectivity, motion sensing, and/or audio/image/video input from the recipient device 30.

Figure 5C:
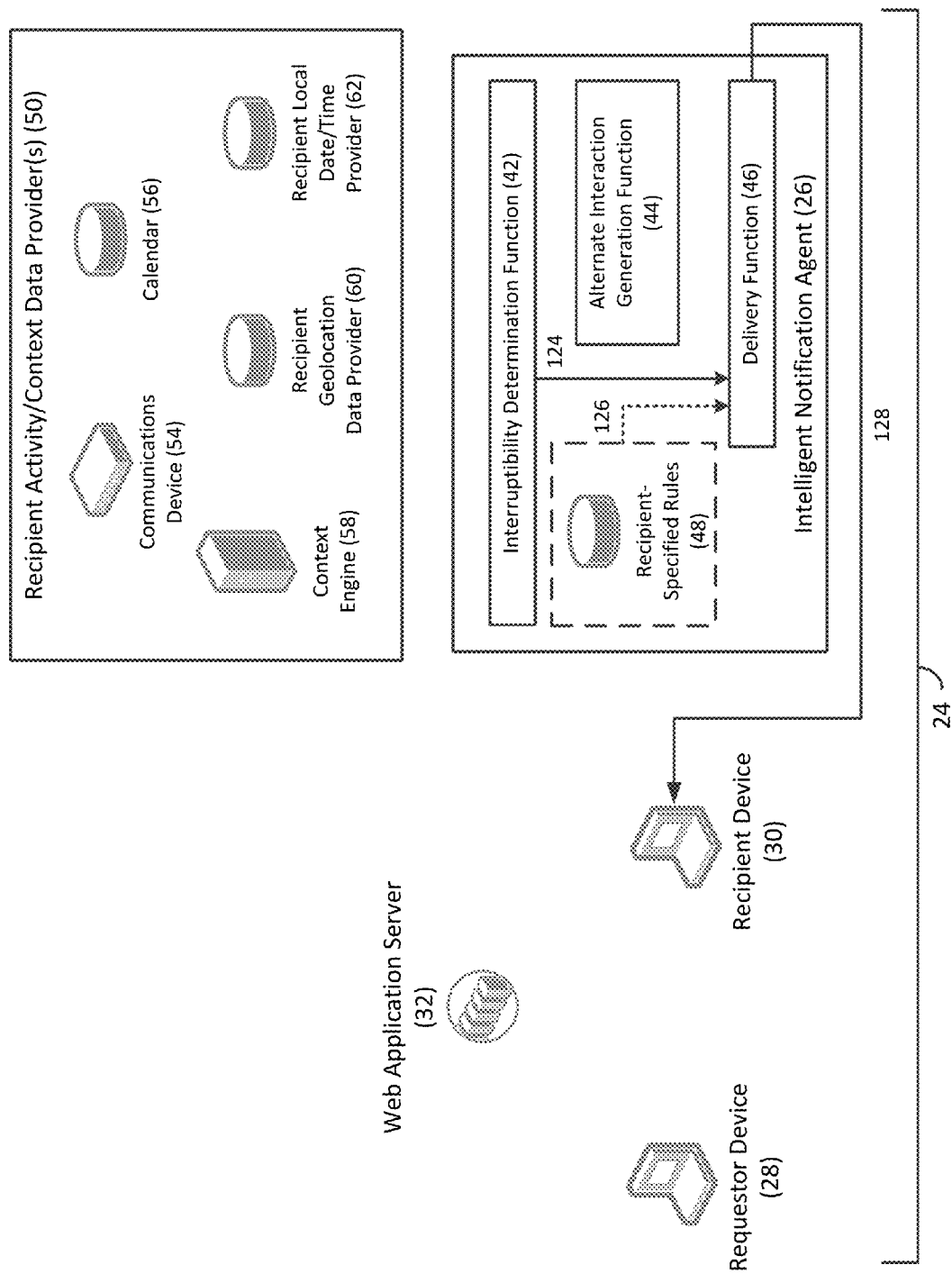

As discussed above with respect to FIGS. 4A and 4B, the interruptibility determination function 42 of the intelligent notification agent 26 determines an interruption indicator based on a recipient activity priority and a delivery priority of the request for real-time online interaction. In this regard, FIG. 5C illustrates the communications flow resulting when the interruptibility determination function 42 determines that the delivery priority of the request for real-time online interaction exceeds the recipient activity priority. In this example, the interruptibility determination function 42 transmits the request for real-time online interaction to the delivery function 46 of the intelligent notification agent 26, as shown by arrow 124. In some embodiments, the delivery function 46 may also optionally receive recipient-specified rules 48 indicating recipient preferences regarding notification of requests for real-time online interaction, as represented by arrow 126. The delivery function 46 then delivers a notification of the request for real-time online interaction to the recipient device 30, as indicated by arrow 128.

Figure 5D:
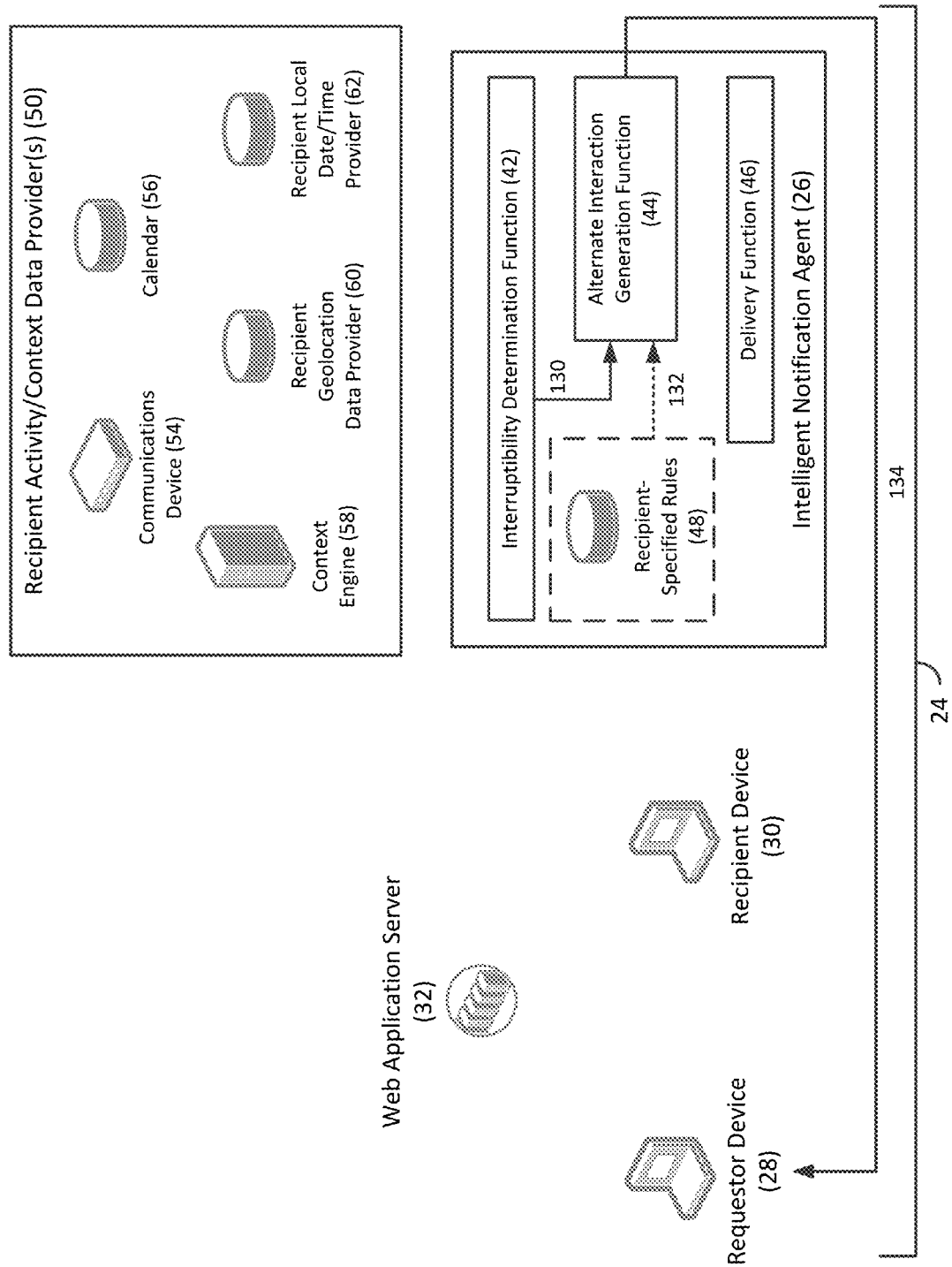

FIG. 5D illustrates the communications flow resulting when the interruptibility determination function 42 determines that the recipient activity priority exceeds the delivery priority of the request for real-time online interaction. In this example, the alternate interaction generation function 44 provides options for the requestor to engage in an alternate interaction with the recipient. The interruptibility determination function 42 transmits the request for real-time online interaction to the alternate interaction generation function 44 of the intelligent notification agent 26, as shown by arrow 130. The interruptibility determination function 42 may also transmit data related to scheduled activities for the recipient and/or scheduled activities for the requestor that was previously transmitted from the calendar 56 to the alternate interaction generation function 44. In some embodiments, the alternate interaction generation function 44 may also optionally receive recipient-specified rules 48 indicating recipient preferences regarding alternate interactions, as represented by arrow 132. Some embodiments may provide that the alternate interaction generation function 44 receives data related to scheduled events of the requestor and/or the recipient from the requestor device 28 and/or the recipient device 30, respectively (not shown). Based on the data received, the alternate interaction generation function 44 then provides the generated options for alternate interaction to the requestor device 28, as indicated by arrow 134. In some embodiments, the alternate interaction generation function 44 may determine a time period during which both the recipient and the requestor are indicated as being available. The alternate interaction generation function 44 then provides the time period to the requestor device 28 as a suggested time for an alternate interaction. Some embodiments may provide that the alternate interaction generation function 44 provides a suggested alternate means of interaction, such as via an SMS messaging session, an MMS messaging session, an IM messaging session, a voice message, a video message, an email, or some other form of interaction to the recipient device 30.

Figure 6:
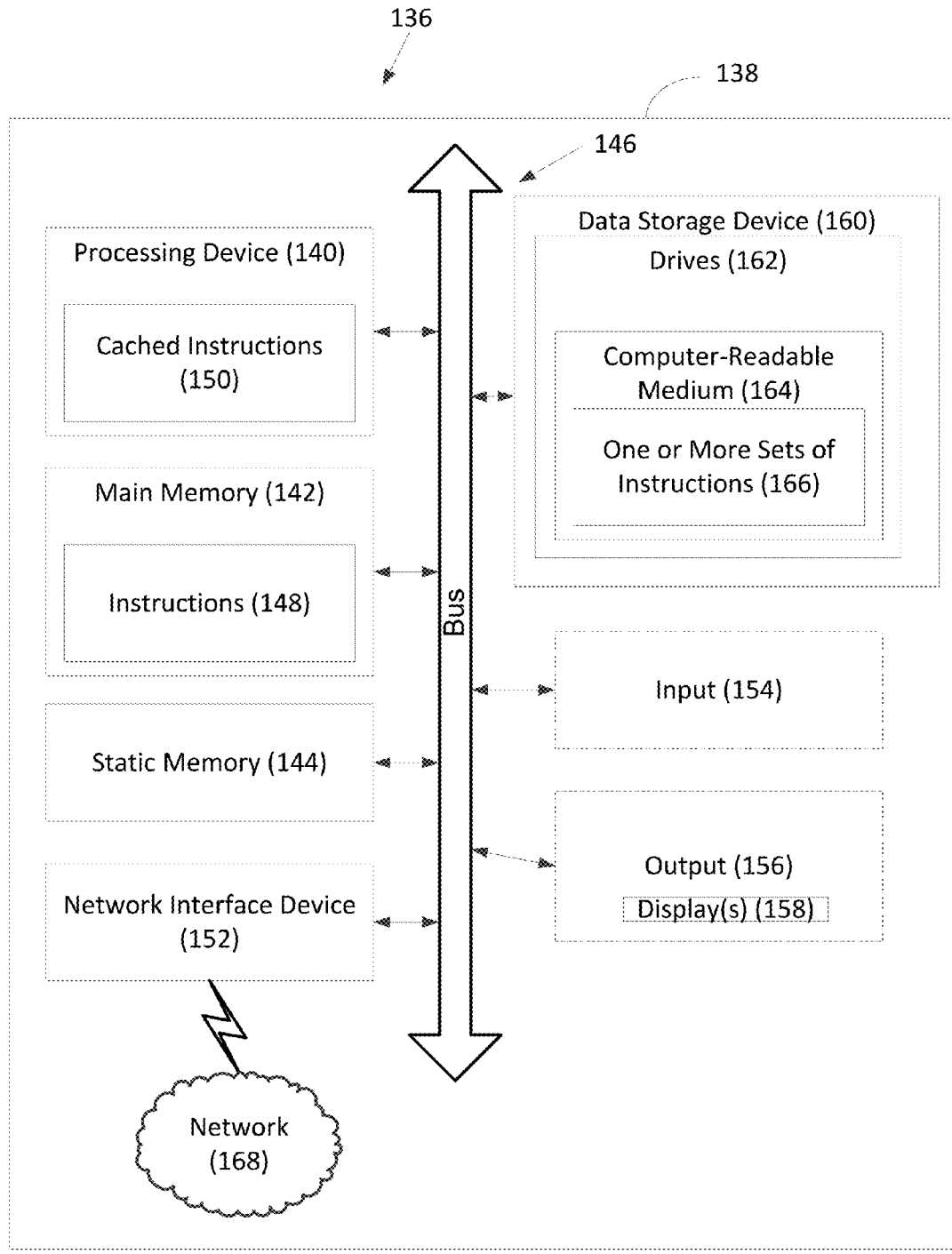
FIG. 6 is a block diagram of an exemplary processor-based system that may include the intelligent notification systems of FIGS. 2 and 6A-6D.

FIG. 6 provides a schematic diagram representation of a collaboration system 136 in the exemplary form of an exemplary computer system 138 adapted to perform the functions described herein. In some embodiments, the collaboration system 136 may execute instructions to perform the functions of the intelligent notification agent 26 of FIG. 2. In this regard, the collaboration system 136 may comprise the computer system 138 within which a set of instructions for causing the collaboration system 136 to perform any one or more of the methodologies discussed herein may be executed. The collaboration system 136 may be connected (as a non-limiting example, networked) to other machines in a local area network (LAN), an intranet, an extranet, or the Internet. The collaboration system 136 may operate in a client-server network environment, or as a peer machine in a peer-to-peer (or distributed) network environment. While only a single collaboration system 136 is illustrated, the terms "controller" and "server" shall also be taken to include any collection of machines that individually or jointly execute a set (or multiple sets) of instructions to perform any one or more of the methodologies discussed herein. The collaboration system 136 may be a server, a personal computer, a desktop computer, a laptop computer, a personal digital assistant (PDA), a computing pad, a mobile device, or any other device and may represent, as non-limiting examples, a server or a user's computer.

The exemplary computer system 138 includes a processing device or processor 140, a main memory 142 (as non-limiting examples, read-only memory (ROM), flash memory, dynamic random access memory (DRAM) such as synchronous DRAM (SDRAM), etc.), and a static memory 144 (as non-limiting examples, flash memory, static random access memory (SRAM), etc.), which may communicate with each other via a bus 146. Alternatively, the processing device 140 may be connected to the main memory 142 and/or the static memory 144 directly or via some other connectivity means.

The processing device 140 represents one or more processing devices such as a microprocessor, central processing unit, or the like. More particularly, the processing device 140 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 140 is configured to execute processing logic in instructions 148 and/or cached instructions 150 for performing the operations and steps discussed herein.

The computer system 138 may further include a communications interface in the form of a network interface device 152. It also may or may not include an input 154 to receive input and selections to be communicated to the computer system 138 when executing instructions. It also may or may not include an output 156, including but not limited to display(s) 158. The display(s) 158 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 138 may or may not include a data storage device 160 that includes using drive(s) 162 to store the functions described herein in a computer-readable medium 164, on which is stored one or more sets of instructions 166 (e.g., software) embodying any one or more of the methodologies or functions described herein. The functions can include the methods and/or other functions of the collaboration system 136, a participant user device, and/or a licensing server, as non-limiting examples. The one or more sets of instructions 166 may also reside, completely or at least partially, within the main memory 142 and/or within the processing device 140 during execution thereof by the computer system 138, the main memory 142, and the processing device 140 also constituting machine-accessible storage media. The instructions 148, 150, and/or 166 may further be transmitted or received over a network 168 via the network interface device 152. The network 168 may be an intra-network or an inter-network.

While the computer-readable medium 164 is shown in an exemplary embodiment to be a single medium, the term "machine-accessible storage medium" should be taken to include a single medium or multiple media (as non-limiting examples, a centralized or distributed database, and/or associated caches and servers) that store one or more sets of instructions 166. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for intelligently processing a request to establish a Web Real Time Communication (WebRTC) flow via network, comprising:
   receiving, by a computing device, a request to establish a WebRTC flow directed to a recipient identifier associated with a recipient device of a recipient and originating from a requestor device of a requestor, the request to establish the WebRTC flow comprising a WebRTC offer message;

prior to delivering the WebRTC offer message to the recipient device, evaluating, by the computing device, recipient activity and a context for the recipient activity based on a weight assigned to each of a plurality of recipient activities and a plurality of contexts for the recipient activities, determining, by the computing device, a recipient activity priority based on the weighted evaluation of the recipient activity and context for the recipient activity, evaluating, by the computing device, a context for the request to establish the WebRTC flow based on a weight assigned to each of a plurality of contexts for the request to establish the WebRTC flow, determining, by the computing device, a delivery priority of the request to establish the WebRTC flow based on the weighted evaluation of the context for the request to establish the WebRTC flow, and determining, by the computing device, an interruption indicator based on one or more recipient-specified rules, wherein the one or more recipient-specified rules define and the interruption indicator indicates a relative priority between the recipient activity priority and the delivery priority of the request to establish the WebRTC flow;

responsive to the interruption indicator indicating that the recipient activity priority exceeds the delivery priority of the request to establish the WebRTC flow and instead of delivering the WebRTC offer message to the recipient device, determining whether to ignore the request, suggest an alternate communication media for a communication associated with the request, or suggest an alternate time for the WebRTC flow; and in response to determining to suggest an alternate time, evaluating a scheduled activity of the recipient, evaluating a scheduled activity of the requestor, determining, based on the evaluating, a time period for an alternate interaction with the recipient, and providing the time period to the requestor device as a suggested time for the alternate interaction in response to the WebRTC offer message.

2. The method of claim 1, further comprising providing the requestor device with one or more options for the alternate interaction, the one or more options comprising a Short Messaging Service (SMS) messaging session, a Multimedia Messaging Service (MMS) messaging session, an Instant Messaging (IM) messaging session, a voice message, a video message, an email with the recipient, or combinations thereof.

3. The method of claim 1, wherein the request to establish the WebRTC flow comprises a request for a real-time video, voice, or combinations thereof.

4. The method of claim 1, wherein the request to establish the WebRTC flow comprises a request for a multiparty interaction.

5. The method of claim 1, wherein the recipient activity comprises a current activity of the recipient, the scheduled activity of the recipient, or combinations thereof.

6. The method of claim 1, wherein the context for the recipient activity comprises a subject matter of the recipient activity, a location of the recipient, a local date for the recipient, or a local time for the recipient, or combinations thereof.

7. The method of claim 1, wherein the context for the request to establish the WebRTC flow comprises an identity of the requestor, a history of interaction between the recipient and the requestor, a relationship between the recipient and the requestor, a scheduled activity of the requestor, a current activity of the requestor, a content of a message from the requestor accompanying the request to establish the WebRTC flow, metadata for the request to establish the WebRTC flow, or combinations thereof.

8. The method of claim 1 further comprising, responsive to the interruption indicator indicating that the delivery priority of the request to establish the WebRTC flow exceeds the recipient activity priority, delivering a notification of the request to establish the WebRTC flow to the recipient device of the recipient.

9. A system for providing intelligent notification of a request to establish a Web Real Time Communication (WebRTC) flow, comprising:

at least one communications interface; and an intelligent notification agent associated with the at least one communications interface, the intelligent notification agent configured to:

receive a request to establish a WebRTC flow directed to a recipient identifier associated with a recipient device of a recipient and originating from a requestor device of a requestor, the request to establish the WebRTC flow comprising a WebRTC offer message;

prior to delivering the WebRTC offer message to the recipient device, evaluate recipient activity and a context for the recipient activity based on a weight assigned to each of a plurality of recipient activities and a plurality of contexts for the recipient activities, determine a recipient activity priority based on the weighted evaluation of the recipient activity and context for the recipient activity, evaluate a context for the request to establish the WebRTC flow based on a weight assigned to each of a plurality of contexts for the request to establish the WebRTC flow, determine a delivery priority of the request to establish the WebRTC flow based on the weighted evaluation of context for the request to establish the WebRTC flow, and determine an interruption indicator based on one or more recipient-specified rules, wherein the one or more recipient-specified rules define and the interruption indicator indicates a relative priority between the recipient activity priority delivery priority of the request to establish the WebRTC flow;

responsive to the interruption indicator indicating that the recipient activity priority exceeds the delivery priority of the request to establish the WebRTC flow and instead of delivering the WebRTC offer message to the recipient device, determining whether to ignore the request, suggest an alternate communication media for a communication associated with the request, or suggest an alternate time for the WebRTC flow; and in response to determining to suggest an alternate time, evaluate a scheduled activity of the recipient and a scheduled activity of the requestor, determine, based on the evaluating, a time period for an alternate interaction with the recipient, and provide the time period to the requestor device as a suggested time for the alternate interaction in response to the WebRTC offer message.

10. The system of claim 9, wherein the intelligent notification agent is configured to determine the interruption indicator based on evaluating the recipient activity by evaluating a current activity of the recipient, the scheduled activity of the recipient, or combinations thereof.

11. The system of claim 9, wherein the intelligent notification agent is configured to determine the interruption indicator based on evaluating the context for the recipient activity by evaluating a subject matter of the recipient activity, a location of the recipient, a local date for the recipient, or a local time for the recipient, or combinations thereof.

12. The system of claim 9, wherein the intelligent notification agent is configured to determine the interruption indicator based on evaluating the context for the request to establish the WebRTC flow by evaluating an identity of the requestor, a history of interaction between the recipient and the requestor, a relationship between the recipient and the requestor, the scheduled activity of the requestor, a current activity of the requestor, a content of a message from the requestor accompanying the request to establish the WebRTC flow, metadata for the request to establish the WebRTC flow, or combinations thereof.

13. A non-transitory computer-readable medium having stored thereon computer-executable instructions to cause a processor to implement a method comprising:
  receiving a request to establish a Web Real Time Communication (WebRTC) flow directed to a recipient identifier associated with a recipient device of a recipient and originating from a requestor device of a requestor, the request to establish the WebRTC flow comprising a WebRTC offer message;
  prior to delivering the WebRTC offer message to the recipient device, evaluating recipient activity and a context for the recipient activity based on a weight assigned to each of a plurality of recipient activities and a plurality of contexts for the recipient activities, determining a recipient activity priority based on the weighted evaluation of the recipient activity and context for the recipient activity, evaluating a context for the request to establish the WebRTC flow based on a weight assigned to each of a plurality of contexts for the request to establish the WebRTC flow, determining a delivery priority of the request to establish the WebRTC flow based on the weighted evaluation of context for the request to establish the WebRTC flow, and determining an interruption indicator based on one or more recipient-specified rules, wherein the one or more recipient-specified rules define and the interruption indicator indicates a relative priority between the recipient activity priority delivery priority of the request to establish the WebRTC flow;
  responsive to the interruption indicator indicating that the recipient activity priority exceeds the delivery priority of the request to establish the WebRTC flow and instead of delivering the WebRTC offer message to the recipient device, determining whether to ignore the request, suggest an alternate communication media for a communication associated with the request, or suggest an alternate time for the WebRTC flow; and
  in response to determining to suggest an alternate time, evaluating a scheduled activity of the recipient and a scheduled activity of the requestor, determining, based on the evaluating, a time period for an alternate interaction with the recipient, and providing the time period to the requestor device as a suggested time for the alternate interaction in response to the WebRTC offer message.

14. The method of claim 1, further comprising, responsive to the interruption indicator indicating that the delivery priority of the request to establish the WebRTC flow exceeds the recipient activity priority, delivering a notification of the request to establish the WebRTC flow to the recipient device of the recipient.

15. The system of claim 9, wherein the intelligent notification agent is further configured to, responsive to the interruption indicator indicating that the recipient activity priority to establish the WebRTC flow exceeds the delivery priority of the request, deliver a notification of the request to establish the WebRTC flow to the recipient device of the recipient.

16. The non-transitory computer-readable medium of claim 13, the method further comprising, responsive to the interruption indicator indicating that the recipient activity priority to establish the WebRTC flow exceeds the delivery priority of the request,
  delivering a notification of the request to establish the WebRTC flow to the recipient device of the recipient.

17. The method of claim 8, wherein delivering the notification of the request to establish the WebRTC flow to the recipient device of the recipient comprises determining a priority of an alert for the request, a type of the alert for the request, a visibility of the alert for the request, an audio indicator to be used for the alert for the request, or an audio volume of the alert for the request, or combinations thereof.

18. The system of claim 9, wherein the intelligent notification agent is further configured to deliver a notification of the request to establish the WebRTC flow to the recipient device of the recipient, responsive to the interruption indicator indicating that the delivery priority of the request to establish the WebRTC flow exceeds the recipient activity priority.

19. The non-transitory computer-readable medium of claim 13 having stored thereon the computer-executable instructions to cause the processor to implement the method further comprising, responsive to the interruption indicator indicating that the delivery priority of the request to establish the WebRTC flow exceeds the recipient activity priority, delivering a notification of the request to establish the WebRTC flow to the recipient device of the recipient.

* * * * *

UNITED STATES PATENT AND TRADEMARK OFFICE
CERTIFICATE OF CORRECTION

PATENT NO. : 10,164,929 B2
APPLICATION NO. : 13/803292
DATED : December 25, 2018
INVENTOR(S) : John H. Yoakum Page 1 of 1

It is certified that error appears in the above-identified patent and that said Letters Patent is hereby corrected as shown below:

In the Claims

At Column 18, Lines 29-36, please delete Claim 17 in its entirety and replace it with:
17. The method of claim 1 further comprising, responsive to the interruption indicator indicating that the delivery priority of the request to establish the WebRTC flow exceeds the recipient activity priority, delivering a notification of the request to establish the WebRTC flow to the recipient device of the recipient.

Signed and Sealed this
Nineteenth Day of March, 2019

Andrei Iancu
*Director of the United States Patent and Trademark Office*